United States Patent [19]

Manning

[11] Patent Number: 4,946,189
[45] Date of Patent: Aug. 7, 1990

[54] REAR SUSPENSION

[75] Inventor: Donald L. Manning, Orchard Lake, Mich.

[73] Assignee: DLMA Transportation Inc., Troy, Mich.

[21] Appl. No.: 380,390

[22] Filed: Jul. 17, 1989

[51] Int. Cl.$^5$ ............................................. B60G 9/02
[52] U.S. Cl. .................................. 280/688; 280/702; 180/349
[58] Field of Search ............... 280/702, 711, 688, 713, 280/724, 725; 180/349, 353

[56] References Cited

U.S. PATENT DOCUMENTS 3,744,813  7/1973  Magleave et al. .................. 280/713
4,248,455  2/1981  Manning ............................ 280/711

FOREIGN PATENT DOCUMENTS 232205   1/1961  Australia ............................ 280/702
1237843  6/1960  France ............................... 280/724
627652  11/1961  Italy .................................. 180/349

Primary Examiner—Charles A. Marmor
Assistant Examiner—Karin Tyson
Attorney, Agent, or Firm—Reising, Ethington, Barnard, Perry & Milton

[57] ABSTRACT

A rear suspension particularly adapted for light and medium weight trucks and buses wherein a chassis and body are supported upon a dead axle the latter of which is of a light weight and rigid construction so as to permit a lower positioning of the chassis relative to the ground.

8 Claims, 4 Drawing Sheets

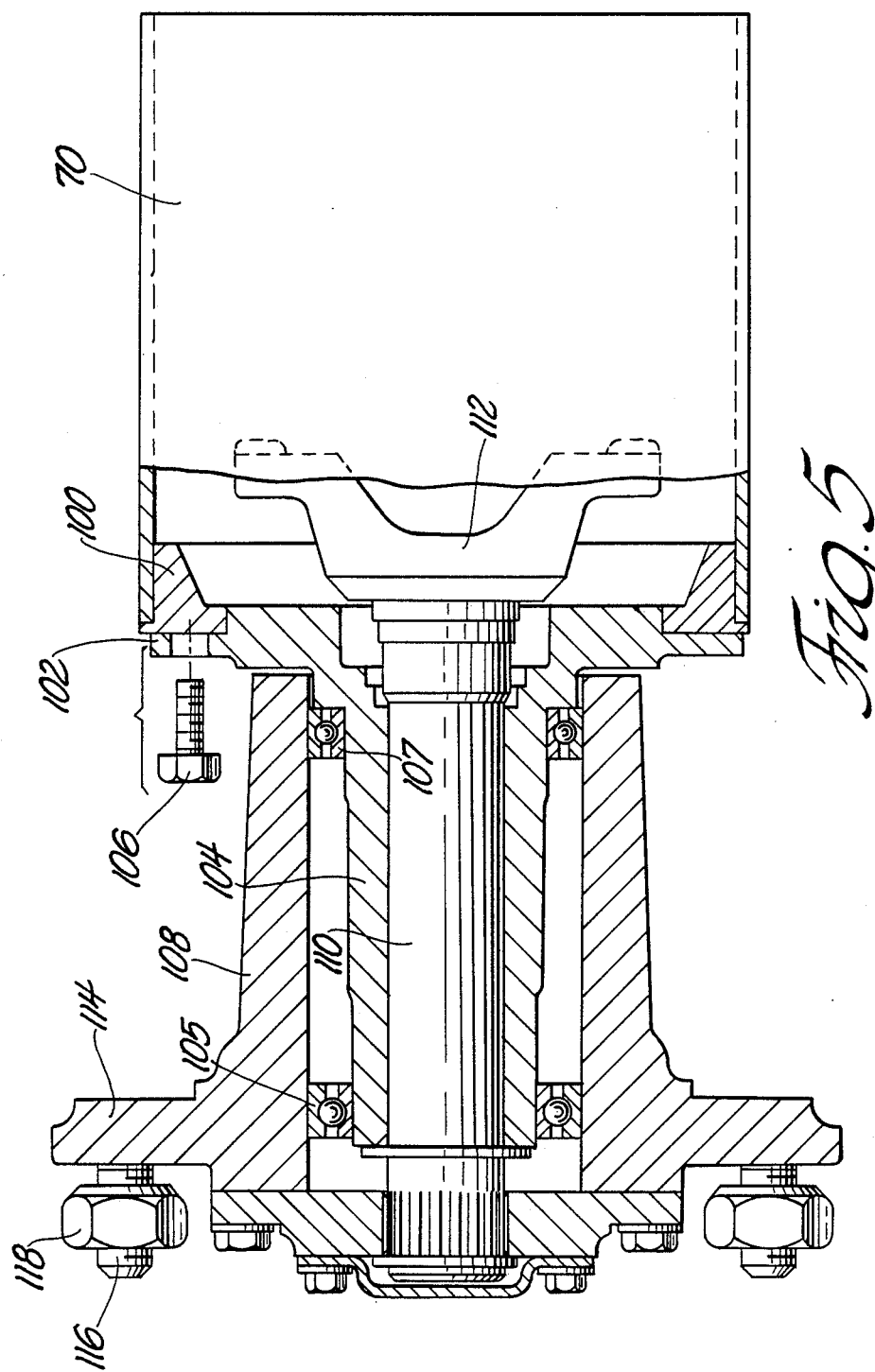

REAR SUSPENSION

BACKGROUND OF THE INVENTION

The present invention relates to a light weight rear suspension of the type particularly adapted to be used with light and medium trucks and buses utilizing a conventional chassis. The suspension of the subject invention is particularly adapted for use with trucks and buses wherein it has become increasingly important both to lower the floor level of the associated vehicle for easier access as well as to reduce the unsprung weight of the suspension thereby contributing to overall improved fuel economy for such vehicle.

The present suspension is primarily articulated to the chassis through a single forwardly disposed joint which eliminates the need for a plurality of radius rods as required by previous suspensions used in truck and bus applications. Thus, while the suspension of the present invention is intended for use with trucks and buses, it has been made in such a way as to be substantially lighter and less complicated than previous suspensions used for the same application.

PRIOR ART

Among the prior art of which applicant is aware and from which the subject invention has evolved are his own U.S. Pat. Nos. 4,343,375 and 4,362,221. It is a particular objective of applicant's present suspension invention to further reduce the unsprung weight and complication of the suspensions shown in his aforecited patents and in order that they be better usable with lighter weight vehicles. While these earlier patents represent successful suspensions for heavy-duty vehicles, the need for ever lighter and less costly suspensions has led to the development of the subject suspension.

The following earlier U.S. patents 1,394,099 Lansden and 2,132,963 Nallinger were cited against applicant's earlier noted patents and bear a similarity to the subject invention in that they utilize a rear suspension having a single primary point of articulation to a chassis. While the present invention has similar features to all of the foregoing prior art patents, the unique configuration and construction of the suspension of the present invention is clearly distinguishable and provides an improved suspension not shown or suggested by the prior art.

SUMMARY OF THE INVENTION

The subject rear suspension is generally of the type referred to as a dead axle in that the suspension is adapted to support the rear driving wheels and the vehicle body through suitable spring means. However, the wheel driving axles and differential are separate from the suspension in that the differential and the axles are supported upon the vehicle body or chassis and move vertically independently of the dead axle or suspension. This relationship is also true with respect to aforenoted prior art patents. More specifically, the dead axle of the invention is of a cathedral shape in that it includes a pair of parallel and longitudinally extending beam sections at the rear end thereof and a pair of integrally connected beam sections which project forwardly and inwardly to converge in an apex which is the point of articulation to the chassis. Wheel supporting subassemblies or spindle mounts are fixed upon and project above the longitudinal beam sections. The spindle mounts include outwardly projecting wheel supporting sleeves which are generally transversely aligned with the live or driving axles and the differential. The dead axle also includes a transverse beam interconnecting the longitudinal beam sections rearwardly of the wheel supporting spindle mounts and forwardly of the rearward ends of the longitudinal beam sections. The particular configuration and formation of the wheel supporting spindle mounts and the way in which the mounts are supported upon the longitudinal beam sections and reinforced by the transverse beam is an important part of the subject invention. The longitudinal beams extend rearwardly beyond the transverse beam and are adapted to support spring means which are, in turn, adapted to support the vehicle body upon the suspension.

The details and means by which the advantages of the subject invention are attained will be better understood from the following description of the invention and having reference to the attached drawings wherein:

BRIEF DESCRIPTION OF THE DRAWINGS

FIG. 5 is a detailed view of that portion of the wheel supporting spindle mount as indicated by the circled area 5 in FIG. 1.

BEST MODE OF THE INVENTION

Figure 1:
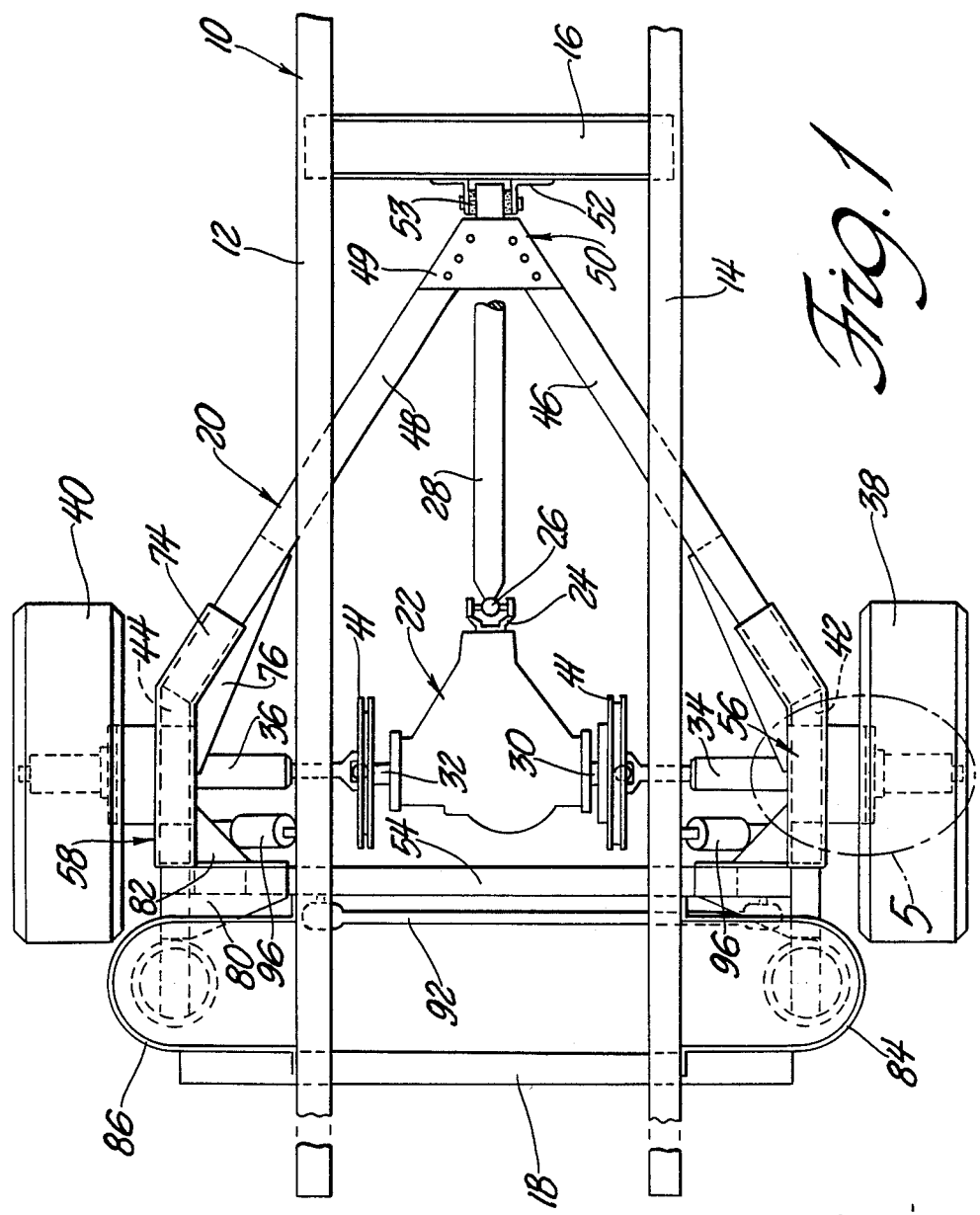
FIG. 1 is a plan view of the suspension as articulated to a vehicle chassis.
Figure 2:
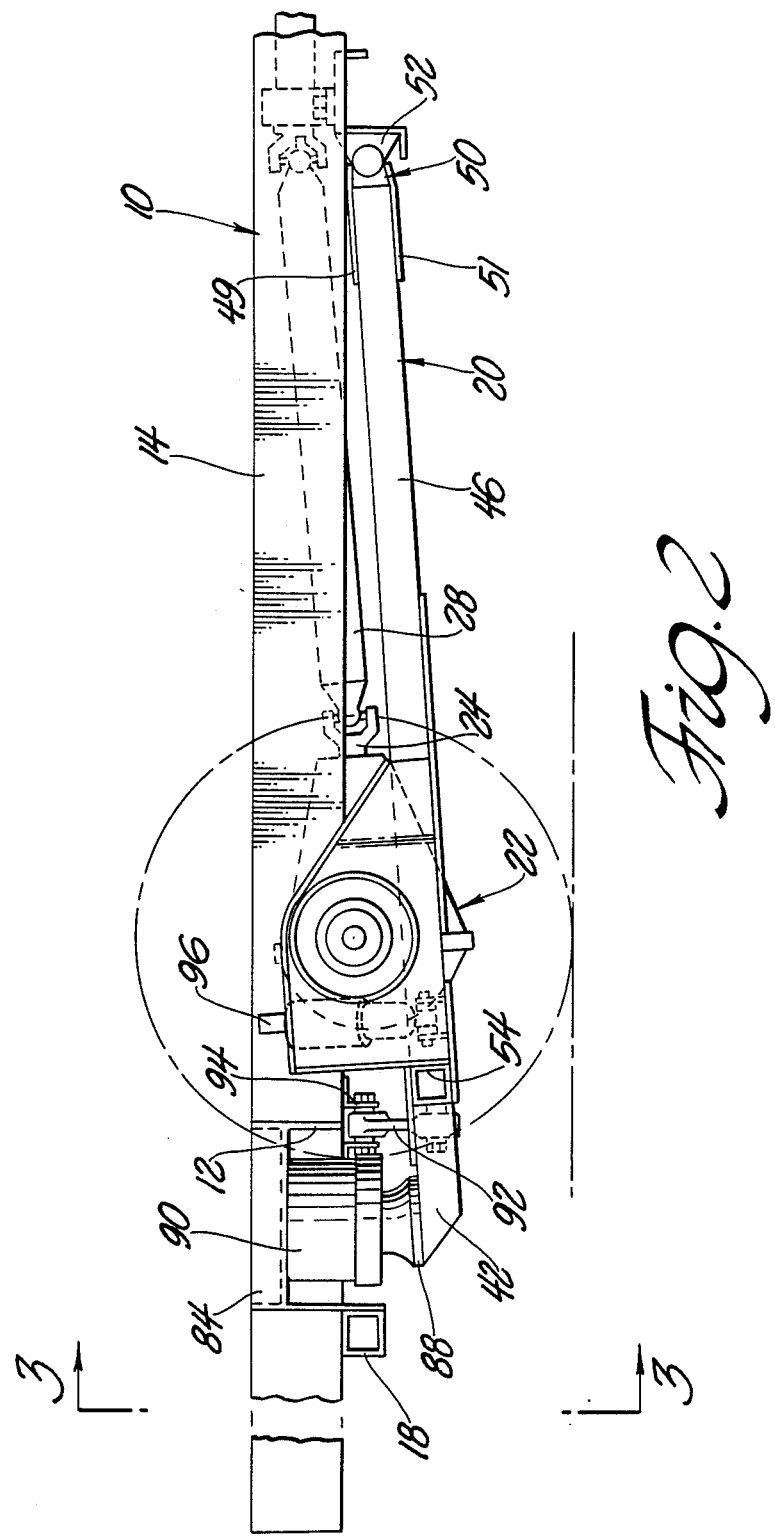
FIG. 2 is a side elevational view along lines 2—2 of FIG. 1.
Figure 3:
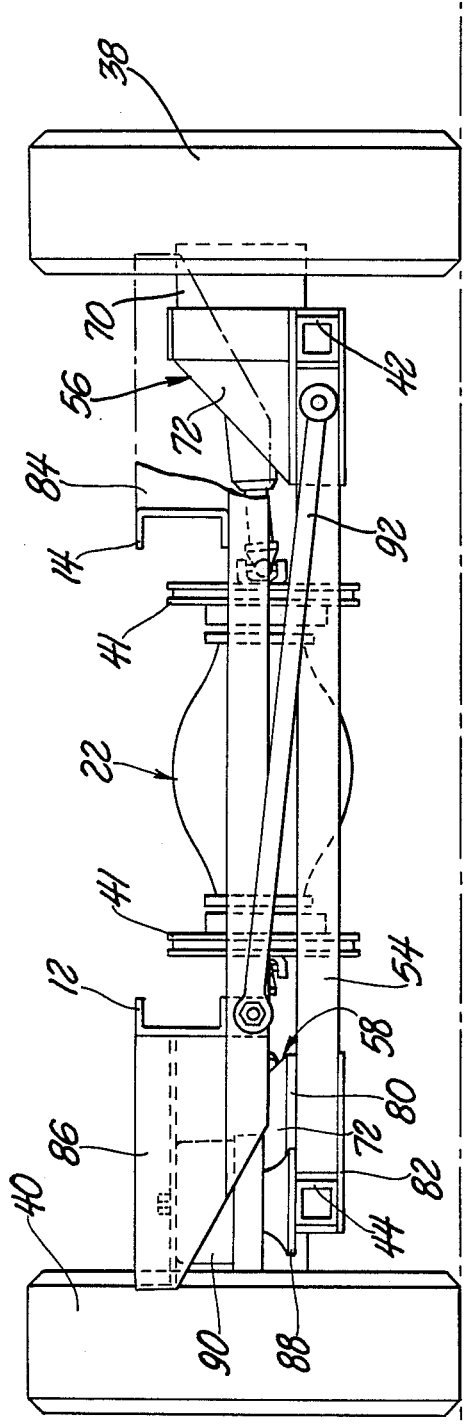
FIG. 3 is a rear end view looking forwardly along lines 3—3 of FIG. 2.

With particular reference to FIGS. 1 and 2, a vehicle chassis is indicated generally at 10 and is adapted to support a vehicle body, not shown, thereupon. Chassis 10 includes a pair of longitudinal beams 12 and 14 which may be of the C-shaped configuration as shown in FIG. 3. Chassis 10 includes a forward transverse beam 16 suitably secured, as by welding, between the longitudinal beams 12 and 14. The chassis also includes a rear transverse beam 18 disposed longitudinally rearwardly of the rear suspension indicated generally at 20.

As best seen in FIGS. 1 and 3, a differential is indicated generally at 22 and is adapted to be fixed by suitable bracketry, not shown, directly to the chassis 10 or the vehicle body structure supported upon the chassis. Thus, the differential is adapted to move vertically with the chassis and body and relative to the rear suspension 20. As with prior art devices, the mounting of the differential to the chassis or vehicle body reduces the unsprung weight of the rear suspension.

Differential 22 includes a power input shaft 24 connected through a suitable universal joint 26 to an engine driven propeller shaft 28. The differential includes power output shafts 30 and 32 connected through suitable universal joints to live or power axles 34 and 36 which are, in turn, drivingly connected to rear wheels 38 and 40. The manner in which the live axles 34 and 36 are connected to the driving wheels will be described later in relation to FIG. 5 of the drawings.

Inboard mounted disc brakes are indicated at 41 and coact with either the differential output shafts 30 and 32 or live axles 34 and 36 to provide suitable rear wheel braking action. It is to be understood that more conventional outboard brakes located proximate wheels 38 and 40 can also be used.

The rear suspension or dead axle 20 consists of several major coacting components. As earlier suggested, the dead axle may be referred to as having a cathedral shape in which there are a first pair of longitudinally extending beam sections 42 and 44 transversely spaced outboard of the chassis beams 12 and 14. The cross sectional shape or configuration of the longitudinal beams and other associated members is most important in providing a light weight and yet extremely strong suspension construction. As particularly seen in FIGS. 3 and 4, the beam cross sections are hollow and of rectangular or, more preferably, square configuration. These shapes are to be particularly contrasted with the tubular members utilized in the aforenoted Lansden and Nallinger suspensions relative to which longitudinal bending and torsional wind up are experienced detracting from the rigidity of the suspension.

A second pair of beam sections 46 and 48 are connected to the forward ends of the longitudinal beam sections, as by butt welding, and extend forwardly and inwardly therefrom and converge in an apex joint 50 which is articulated through a trunion member 52 to chassis transverse beam 16. Upper and lower plates 49 and 51 are suitably secured to beam sections 46 and 48 to reinforce apex joint 50. Trunion 52 preferably includes a heavy rubber bushing 53. The cross sectional shape of the inwardly angled beam sections 46 and 48 is the same as that of the longitudinal beam sections 42 and 44. A transverse beam 54 is secured to the respective longitudinal beam sections 42,44 and forwardly spaced from the rear ends of these sections. The cross-sectional shape of transverse beam 54 is generally the same as that of the longitudinal beam sections 42 and 44.

Figure 4:
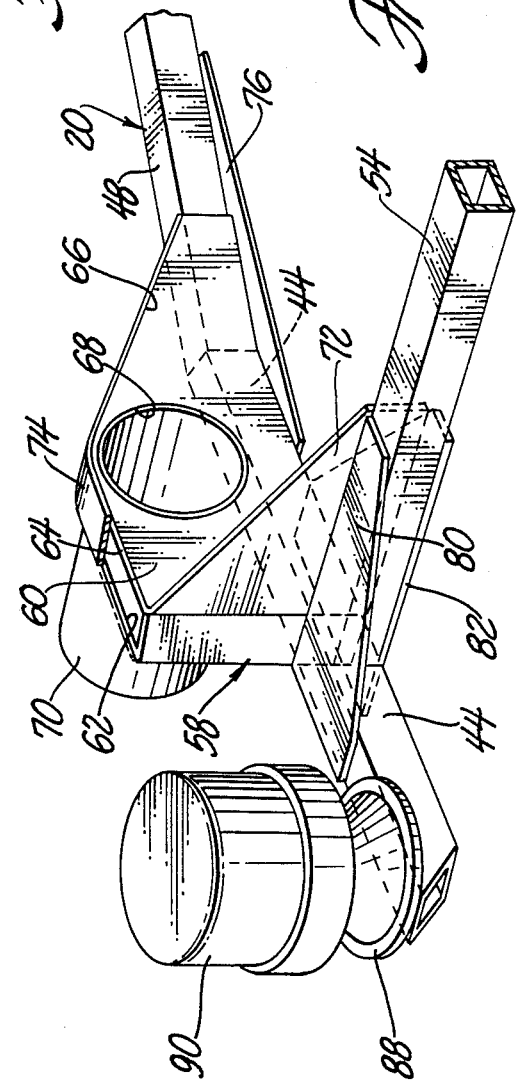
FIG. 4 is a partial perspective view showing the details of a wheel supporting subassembly or spindle mount.

In order to enable the lowering of the rear suspension or dead axle and to thereby also lower the floor height of the vehicle body supported on chassis 10, the dead axle includes a pair of identical wheel supporting spindle mounts 56 and 58 suitably supported upon the respective longitudinal beam sections 42 and 44. Inasmuch as they are identical, only one wheel supporting mount will be described. Referring most particularly to FIG. 4, spindle mount 58 is of a hollow construction and is comprised of a pair of plate members 60 and 62 secured, preferably as by welding, to the vertical inside and outside walls of the sub-adjacent longitudinal beam section 44. Each plate members 60 and 62 projects vertically above the sub-adjacent beam section and includes an upper edge having a horizontal portion 64 and a forwardly declining portion 66 which terminates at the upper surface of the sub-adjacent beam section 48. By declining the edge portions 66 of plates 60 and 62 unnecessary material is eliminated thereby reducing the weight of the dead axle. As best seen in FIG. 3, the topmost part of spindle mount 56 extends above the bottom of chassis 10.

A pair of transversely aligned openings 68, only one of which is seen, are respectively formed in plates 60 and 62 and are adapted to receive a wheel supporting sleeve 70 which is suitably secured to the plates as by welding around the juncture between the sleeve and the plates.

In order to rigidify the wheel supporting spindle mount 58, and other axle structure, the rear end off inside plate 60 is bent at a right angle to form a triangulated section 72 which is secured as by welding, to the front vertical face of transverse beam 54. Likewise, the rear end of outside plate 62 is bent at a right angle and welded to inside plate 60.

The forward ends of plates 60 and 62 are angled inwardly at the juncture of beam sections 42,44 and 46,48 and thereafter welded to the inner and outer vertical walls of beam section 48.

To further rigidify and enclose the spindle mount 58, an angled top plate member 74 is welded to the upper edge portions 64 and 66 of plates 60 and 62.

Again for the purpose of rigidifying or strengthening the light weight dead axle, a variety of reinforcing plates are provided to span the junctures between the longitudinal and angled beam sections 42,44 and 46,48 as well as with the transverse beam 54. More specifically, a lower reinforcing plates 76 is secured to the lower surfaces of the adjoining longitudinal and angled beam sections 44 and 48 so as to extend across or span the juncture between such sections.

Additional reinforcing plates 80 and 82 are respectively secured to the upper and lower surfaces of the longitudinal beam section 44 and the transverse beam 54 to thereby span the juncture between this section and beam. It will be noted that the upper reinforcing plate 80 extends toward the rear of the longitudinal beam section while the underlying reinforcing plate 82 extends forwardly and is disposed sub-adjacent mounting spindle 58.

As best seen in FIGS. 1 and 2, chassis beams 12 and 14 extend rearwardly beyond the rear suspension or dead axle 20. Suitable brackets 84 and 86 are secured to the chassis beams and project laterally above the rear ends of the longitudinal beam sections 42,44. Suitable plate members 88 are secured to the upper surface of the longitudinal beam sections proximate the rear end thereof and are adapted to support suitable spring means, such as air bags 90, thereupon. The upper end of the air bags or springs are secured to the chassis brackets 84 and 86 whereby the chassis and vehicle body are supported upon the dead axle through such spring means.

A suitable Panhard rod 92 is articulated at its respective ends to the dead axle transverse beam 54 and chassis beam bracket 94 to prevent lateral movement of the dead axle relative to tihe chassis. Likewise, suitable shock absorbing devices 96 are provided between the dead axle and the chassis to dampen relative vertical movement therebetween.

Reference is made to FIG. 5 for a description of the manner in which wheels 38,40 are mounted upon the dead axle 20. As shown in this FIG. 5, the wheel supporting sleeve 70 includes a ring 100 welded within the outer end of the sleeve and to which a flange 102 of a journal sleeve 104 is secured through suitable stud members 106. An outer journal or hub member 108 is rotatably supported upon the inner journal 104 through suitable bearing members 105 and 107. A stub shaft 110 is connected at its inner end through a suitable connection 112 to a live axle. The outer end of the stub shaft 110 is suitably fixed to the outer journal 108 so as to permit said journal to be driven by the live axle. A radial flange 114 is provided on outer journal 108 and includes stud members 116 affixed thereto and upon which the wheels 38,40 are to be mounted by suitable nuts 118.

Other modifications are possible within the intended scope of the invention as set forth in the hereinafter appended claims.

What is claimed is:

1. A rear suspension assembly of the type including a dead axle (20) adapted to support driving wheels (38,40) outboard thereof; a vehicle body supporting chassis (10), the forward end of said dead axle being articulated to said chassis; a differential (22) mounted to said chassis and having a power input shaft (24) and a pair of output shafts (30,32), a pair of axles drivingly connected between said output shafts (34,36) and said wheels; and spring means (90) supporting said chassis upon said dead axle, the improvement comprising:

sid dead axle having

- A. a first pair of longitudinal beam sections (42,44) respectively disposed outboard and on opposite sides of said differential, said beam sections being parallel and having rectangular cross sections;
- B. a second pair of beam sections (46,48) having the same cross section shape as and abuttingly secured to the front ends of said longitudinal beam sections, each of said second beam sections extending forwardly and inwardly extending from the respective longitudinal beam sections, said second beam sections converging and being joined at their forward ends to provide an apex portion (50) articulated to said chassis; and
- C. wheel supporting spindle mounts (56,58) mounted on and projecting above each of said longitudinal beam sections; each spindle mount including a wheel supporting sleeve (70) transversely aligned with the differential output shafts, said driving axles (34,36) extending through said sleeves and vertically movable relative thereto; and
- D. a transverse beam (54) integrally connecting said longitudinal beam sections and being of the same general cross-sectional shape and size as said beam sections, said transverse beam being disposed immediately rearwardly of said spindle mounts and forwardly of the rear ends of said first beam sections.

2. A rear suspension assembly as set forth in claim 1 wherein each spindle mount includes a pair of plates (60,62) secured to opposite outer walls of the longitudinal and the joined second beam section and projecting vertically thereabove, transversely aligned openings (68) formed in each plate, said wheel supporting sleeve (70) being secured within said plate openings, said plates extending along the length of each longitudinal beam section from the transverse beam and terminating forwardly of the juncture with the associated second beam section, the maximum height of said bridge plates being above the bottom of said chassis.

3. A rear suspension assembly of the type including a dead axle (20) adapted to support driving wheels (38,40) outboard thereof; a vehicle body supporting chassis (10), the forward end of said dead axle being articulated to said chassis; a differential (22) mounted to said chassis and having a power input shaft (24) and a pair of output shafts (30,32) a pair iof axles (34,36) drivingly connecting the output shafts with said wheels; and spring means (90) supporting said chassis upon said dead axle, the improvement comprising:

said dead axle having

- A. a first pair of longitudinal beam sections (42,44) respectively disposed outboard and on opposite sides of said differential, said beam sections being parallel and having rectangular cross sections;
- B. a second pair of beam sections (46,48) having the same cross section shape as and abuttingly secured to the front ends of said longitudinal beam sections, each of said second beam sections extending forwardly and inwardly from said longitudinal beam sections, said second beam sections converging and being joined at their forward ends to provide an apex portion (50) articulated to said chassis;
- C. a wheel supporting spindle mount (58) mounted on and projecting above each of said longitudinal beam sections;
- D. a transverse beam (54) integrally connecting said first pair of longitudinal beam sections and being of the same general cross-sectional shape and size as said beam sections, said transverse beam being disposed immediately rearwardly of said spindle mounts and forwardly of the rear ends of said first beam sections; and
- E. each spindle mount including:
  1. first and second plate members (60,62) suitably secured to opposite sides of the longitudinal and joined second beam sections and projecting thereabove, openings (68) formed in each of said plate members and transversely aligned with said differential;
  2. a wheel supporting sleeve (70) disposed within said openings and secured to said plates, each sleeve projecting laterally outboard of the associated longitudinal beam section;
  3. the rear end of said first plate member being bent inwardly to form a section (72) secured to said transverse beam (54);

said driving axles (34,36) respectively extending through the wheel supporting sleeve (70).

4. A rear suspension assembly as set forth in claim 3 wherein said first and second plate members (60,62) laterally enclose the sub-adjacent longitudinal beam section and have upper edges which include horizontal portions (64) disposed above the bottom of said chassis and downwardly and forwarding inclined portions (66) which terminate proximate the second beam section.

5. A rear suspension assembly as set forth in claim 4 wherein the spindle mount includes a top plate (74) secured to the upper edge portions (64,66) to further enclose the sub-adjacent longitudinal beam section.

6. A rear suspension assembly as set forth in claim 1 wherein said chassis extends rearwardly beyond the dead axle and includes a pair of brackets (84,86) respectively disposed above the rear ends of the longitudinal beam sections (42,44), said spring means (90) being mounted between the chassis brackets and the rear ends of the longitudinal beam sections.

7. A rear suspension assembly as set forth in claim 1 wherein reinforcing plates (76,80,82) are respectively secured at the junctures of the longitudinal beam sections (42,44) with the second beam sections (46,48) and with the transverse beam (54).

8. A rear suspension assembly as set forth in claim 7 wherein forward reinforcing plate (76) is secured to the lower surfaces of the longitudinal and second beam sections to span the junctures between said sections and rearward reinforcing plates (80,82) are respectively secured to the upper and lower surfaces of the longitudinal beam sections and the transverse beam to span the junctures between said sections and said transverse beam.

* * * * *